United States Patent [19]

Osman et al.

[11] Patent Number: 5,687,314

[45] Date of Patent: Nov. 11, 1997

[54] METHOD AND APPARATUS FOR ASSISTING DATA BUS TRANSFER PROTOCOL

[75] Inventors: Fazil I. Osman, Escondido; Robert M. Grow, San Diego; Ronald S. Perloff, Poway; Roger S. Moyers, San Diego; Sally Cordes, Escondido; Lawrence J. Pollack, San Diego, all of Calif.

[73] Assignee: Tele Digital Development, Inc., St. Paul, Minn.

[21] Appl. No.: 896,810

[22] Filed: Jun. 9, 1992

Related U.S. Application Data

[63] Continuation of Ser. No. 759,750, Sep. 12, 1991, abandoned, which is a continuation of Ser. No. 360,351, Jun. 2, 1989, abandoned.

[51] Int. Cl.[6] .................................................. H01J 13/00
[52] U.S. Cl. ........................................................ 395/200.01
[58] Field of Search ........................... 345/325; 364/284, 364/284.3, 284.4; 395/200.01, 200.15, 286, 285

[56] References Cited

U.S. PATENT DOCUMENTS

| | | | |
|---|---|---|---|
| 4,292,669 | 9/1981 | Wollury et al. | 364/DIG. 1 |
| 4,674,033 | 6/1987 | Moer | 364/DIG. 1 |
| 4,766,530 | 8/1988 | Roslund | 364/200 |
| 4,858,112 | 8/1989 | Puerzer et al. | 364/200 |
| 4,967,344 | 10/1990 | Scavezze et al. | 364/200 |
| 5,257,369 | 10/1993 | Skeen et al. | 395/650 |

OTHER PUBLICATIONS

Martin Marietta Technical Data Sheet "FDDI* Single Ring Interface" Martin Marietta Electronics & Missiles Group, Aero & Naval Systems.

Communication Machinery Corporation Bulletin "ENP-10" #6900101, Santa Barbara, California.

Ferranti/DY-4 FDDI Controller Bulletin by AndyHoward and Jeremy James.

PC Magazine Article Entitled "TCP/IP for Multiplatform Networking" by Frank J. Derfler, Jr. Jun. 27, 1989, pp. 247-272.

*Primary Examiner*—Thomas M. Heckler
*Assistant Examiner*—Dennis M. Butler
*Attorney, Agent, or Firm*—Westman, Champlin & Kelly, P.A.

[57] ABSTRACT

A method and apparatus for coupling a signal from one node to another node prepares a signal for transmission, performs error checking on such signal while simultaneously transferring such signal within a transmitting node, transmits the signal from the transmitting node, receives and formats the signal at a receiving node, including an identifying portion and a data portion, and directly stores the data portion in memory that is directly accessible by a user process executing in the receiving node while simultaneously performing error checking.

16 Claims, 5 Drawing Sheets

5,687,314

METHOD AND APPARATUS FOR ASSISTING DATA BUS TRANSFER PROTOCOL

This is a File Wrapper continuation of application(s) Ser. No. 07/759,750 filed on Sept. 12, 1991 now abandoned, which is a File Wrapper Continuation of Ser. No. 07/360,351 filed on Jun. 2, 1989 now abandoned.

FIELD OF THE INVENTION

This invention relates generally to distributed networks, such as multiprocessor shared-data computer networks, and, more particularly, to high-speed computer data transfer devices.

BACKGROUND OF THE INVENTION

There are many occasions when it is desirable to link multiple computers or processors together to form a processing network. Processing networks may offer increased processing speed (throughput) or provide for multiple computers, terminals and peripherals, such as printers, to be interconnected. These processors, terminals and peripherals, or nodes as they are often called, transfer data between one another by means of a network. Networks may take many different configurations, one prominent form being a layered network Protocol. Within a node, layers are partitioned between different hardware and software components. Hardware is often partitioned into different devices over a data bus. Example busses implementing this form are the VME and Multibus data busses.

The data transfer responsibilities among layered network protocols are typically allocated into four or more layers. In a four layer network, the first layer is the physical layer which is the actual physical hardware such as the electrical connections and wires, etc. that carry the digital voltage signals between the nodes. The second is the data link layer which defines the message format and composes message frame structures from the digital signals for data transfer over the physical layer. This layer also checks the quality of the data transfer link. The third is the network layer which is the interface protocol that routes the messages in accordance with their destination addresses. Finally, the fourth is the transport layer which functionally is the highest layer. This layer sets up the data connections and verifies that the correct data was transferred to the correct location.

Often the protocol of two or even four of the layers is handled in one device. Examples of devices defining the physical and data link layers are Ethernet, IBM Token Ring, etc. Examples of the protocol for the network and transport layers (which sometimes are referred to as the network layer and transport layer themselves) are TCP/IP, ISO-Network, and ISO-TP4.

To achieve the maximum efficiency and throughput of a processing network it is desirable to transfer data between user processes as quickly as possible. The amount of data which may be transferred between nodes in a given time interval is called the bandwidth and is often specified in bits per second (bits/second). Increasing the bandwidth of the network may reduce the data transfer delay between user processes and/or reduce the possibility of bus contention (two or more nodes attempting communication over the network bus at the same time).

SUMMARY OF THE INVENTION

The present invention increases the bandwidth of a distributed network by improving performance of data handling functions within respective nodes thereof. Such data handling improvement is achieved by combining functions and eliminating redundant steps. The invention may also contribute a degree of parallelism to the overall system thus increasing its throughput capacity.

According to one aspect of the invention, a method for coupling a signal from one node to another node, includes the steps of preparing a signal for transmission, and performing error checking on such signal while simultaneously transferring such signal. As used herein, the term "transferring" indicates (according to the preferred embodiment and best mode of the invention) the transferring or moving of a signal, data, etc. within a node, although such transferring also may include the transferring or transmitting of a signal, data, etc. between nodes or parts of nodes.

According to another aspect, the invention relates to an apparatus for coupling signals from one node to another node, including a coupling device for coupling the nodes, a means for preparing a signal for transmission, and a means for performing error checking on such signal while simultaneously transferring such signals.

A further aspect relates to a method for coupling one node with another node wherein signals are communicated between the nodes, including the steps of receiving and formatting a signal and performing error checking on such received signal while simultaneously storing such received signal in memory.

Still another aspect of the invention relates to a method for coupling one node with another node wherein a signal is communicated between the nodes and such signal includes an identifying portion and a further portion, including the steps of receiving and formatting such signal and separating from such signal such further portion intended for a user process executing within a node, and directly storing such further portion in memory accessible by a user process executing within the node.

Still a further aspect relates to an apparatus for coupling one node with another node wherein a signal is communicated between the nodes, including means for receiving and formatting a signal and means for performing error checking on such received signal while simultaneously storing such received signal in memory.

Even another aspect of the invention relates to an apparatus for coupling one node with another node to communicate a signal between the nodes, wherein the signal includes an identifying portion and a further portion, including means for receiving and formatting such signal, and means for separating from such signal such further portion intended for a user process executing within a node, and means for directly storing such further portion in memory accessible by a user process executing within the node.

These and other objects, advantages, features and aspects of the present invention will become apparent as the following description proceeds.

To the accomplishment of the foregoing and related ends, the invention, then, comprises and features hereinafter fully described in the specification and particularly pointed out in the claims, the following description and the annexed drawings setting forth in detail a certain illustrative embodiment of the invention, this being indicative, however, of but one of the various ways in which the principles of the invention may be employed. It will be appreciated that the scope of the invention is to be determined by the claims and the equivalents thereof.

DESCRIPTION

Figure 1:
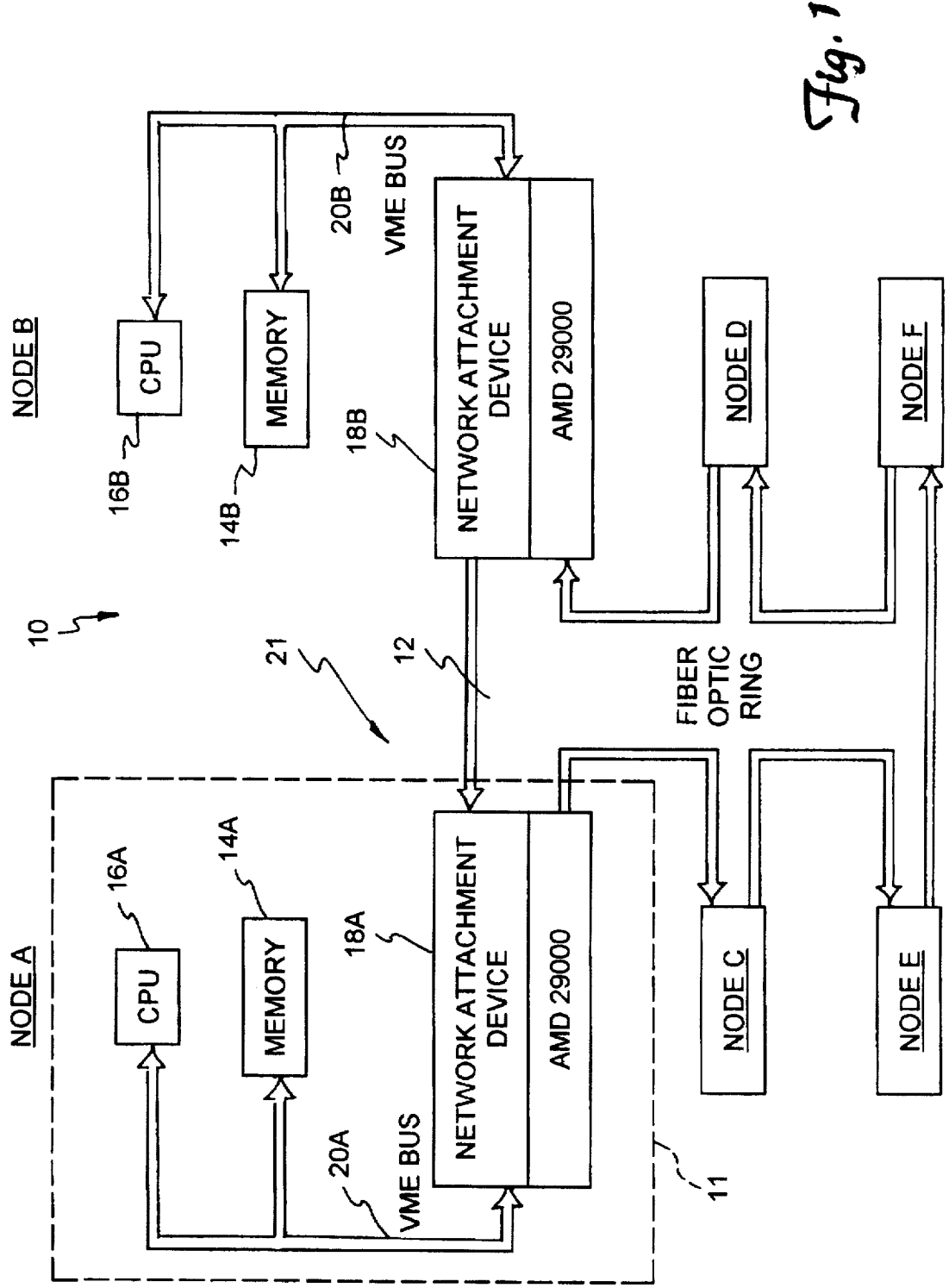
FIG. 1 is a block diagram of a distributed network according to a preferred embodiment of the present invention.

With reference to the drawings, wherein like reference numerals designate like parts in the several figures, and initially to FIG. 1, there is shown a typical distributed network 10 wherein a signal representing data is transferred or is coupled between locations, called nodes 11, for example, by means of a network bus 12, which in the preferred embodiment is a fiber optic ring. As used herein "signal" means an electrical, optical, radio or other type of signal, as is well known. Exemplary signals include a binary signal, a digital signal, a group of such signals in serial or parallel arrangement, etc. Moreover, "data" may mean actual data or information, a message, a digital word of prescribed length, such as a data word of a prescribed length, e.g., eight, sixteen, or thirty-two bits (or smaller or larger size), a command, an instruction, a statement in a computer program, etc. The data and/or word may be represented by such signal. According to the invention data is transferred in a node and is transmitted between or among nodes; the data itself may be represented by a single signal, by a group of signals, etc., as is conventional. The electrical signal or some other signal may also be an analog signal, such as a radio signal. Also, as used herein, the concept of transferring, transmitting, or coupling data includes the transferring, transmitting, or coupling of such a signal in a conductor, an optical system, a radio system, etc. from one node to another node.

The nodes 11 may represent processors, printers, or other circuits that utilize shared memory. Shared memory means that the memory 14 or at least part of the memory at a given node can be accessed for reading and/or writing by plural parts of the node, such as the illustrated CPU 16 and the network attachment device (sometimes referred to as a network attachment board) 18. The network attachment device 18 may be a printed circuit board with various components thereon, as is conventional, or may be some other device. In a distributed system it is usually the case that data in the memory or a part thereof at one node can be transferred to the memory of another node.

The exemplary distributed network 10 in FIG. 1 is shown including six nodes 11 labelled A through F, which are interconnected by the network bus 12, hereinafter also referred to as ring 12 for convenience as the preferred embodiment. The number of nodes may be more or less subject to the constraints of the particular application. For illustration purposes the individual components are shown in nodes A and B only although these or similar components would be included in all the nodes.

Each node includes memory 14, a user process CPU or related computer and/or circuit 16, and a network attachment device 18 interconnected by an internal bus 20, such as a conventional VME bus. The memory 14 could be any memory suitable for use in the particular system implemented, as could be determined by one skilled in the art. The network attachment device 18 may include a CPU devoted to handling network communication. (In the following description suffix letters "a" and "b" will refer to components 14, 16, 18 and 20 of a respective node A or node B.)

The network layer and transport layer protocols together with the network attachment device 18 and the network bus 12 form a network 21 in the distributed network 10.

In the preferred embodiment an AMD 29000 microprocessor is included as part of the network attachment device 18 for execution of portions of the transport and network layer protocol. The AMD 29000 is particularly well suited to this application due to its speed. In other embodiments the protocol may be implemented in logic circuits or executed on other devoted microprocessors, such as a Motorola 68020 or Intel 80386, or on the user process CPU 16, although generally with somewhat less overall throughput of the entire distributed network 10.

The preferred embodiment of the network attachment device 18 implements Transmission Control Protocol/Internet Protocol (TCP/IP) and Fiber Distributed Data Interface (FDDI) for use with the fiber optic ring 12. In this configuration, the TCP/IP then defines the transport and network layer protocols and the FDDI defines the physical and data link layers of the network 21.

Reference to boards or circuit boards or to electrical components herein comprehends one or more electrical circuits and parts or devices of and associated therewith whether or not actually mounted on a circuit board, implemented in an integrated circuit, etc. The preferred embodiment uses printed circuit boards on which circuits are printed and components are mounted and to which electrical and/or optical connections are made. Preferably the network bus is an optical type, as is illustrated and described herein, although other types also may be employed.

When it is necessary for one node to pass information such as data or a command to another node it is done by way of a point-to-point link, bus or ring. As a very generalized example, say CPU 16a of node A needs to command CPU 16b of node B to take some action, such as displaying the time and day on an attached terminal. CPU 16a would construct an appropriate command into message form and place it, via VME bus 20a, into the memory which it can access, memory 14a. In order for CPU 16b to look at the message, however, the message must be in memory that it can access, in this case memory 14b.

Since CPU 16a shares memory 14a with network attachment device 18a via bus 20a, the bus control protocol running on the network attachment device 18a can access the message from memory 14a and send it over the fiber optic ring 12 to node B. The network attachment device 18b at node B will receive the message and receiving protocol operating thereon will put the message into memory 14b via bus 20b. Now, because the CPU 16b and network attachment board 18b at node B share memory 14b, the transfer is completed and CPU 16b can access the message. As a result the time and day will appear on the terminal attached to CPU 16b.

A transfer such as that described above can occur between any of the nodes attached to the fiber optic ring 12 in basically the same manner.

Figure 2:
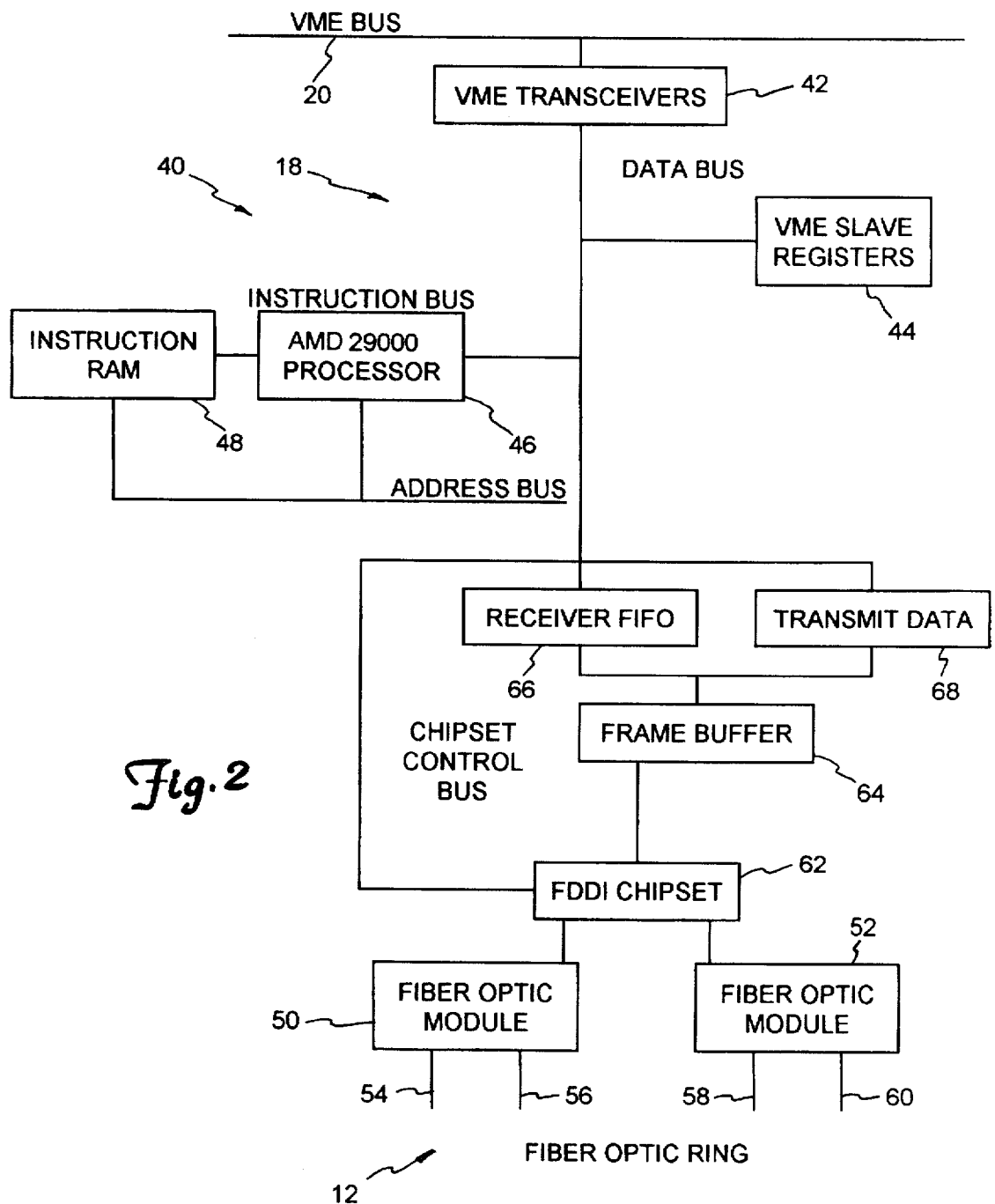
FIG. 2 is a top level block diagram of the network attachment device of the present invention implemented on a VME bus and usable in the distributed network of FIG. 1.
Figure 3:
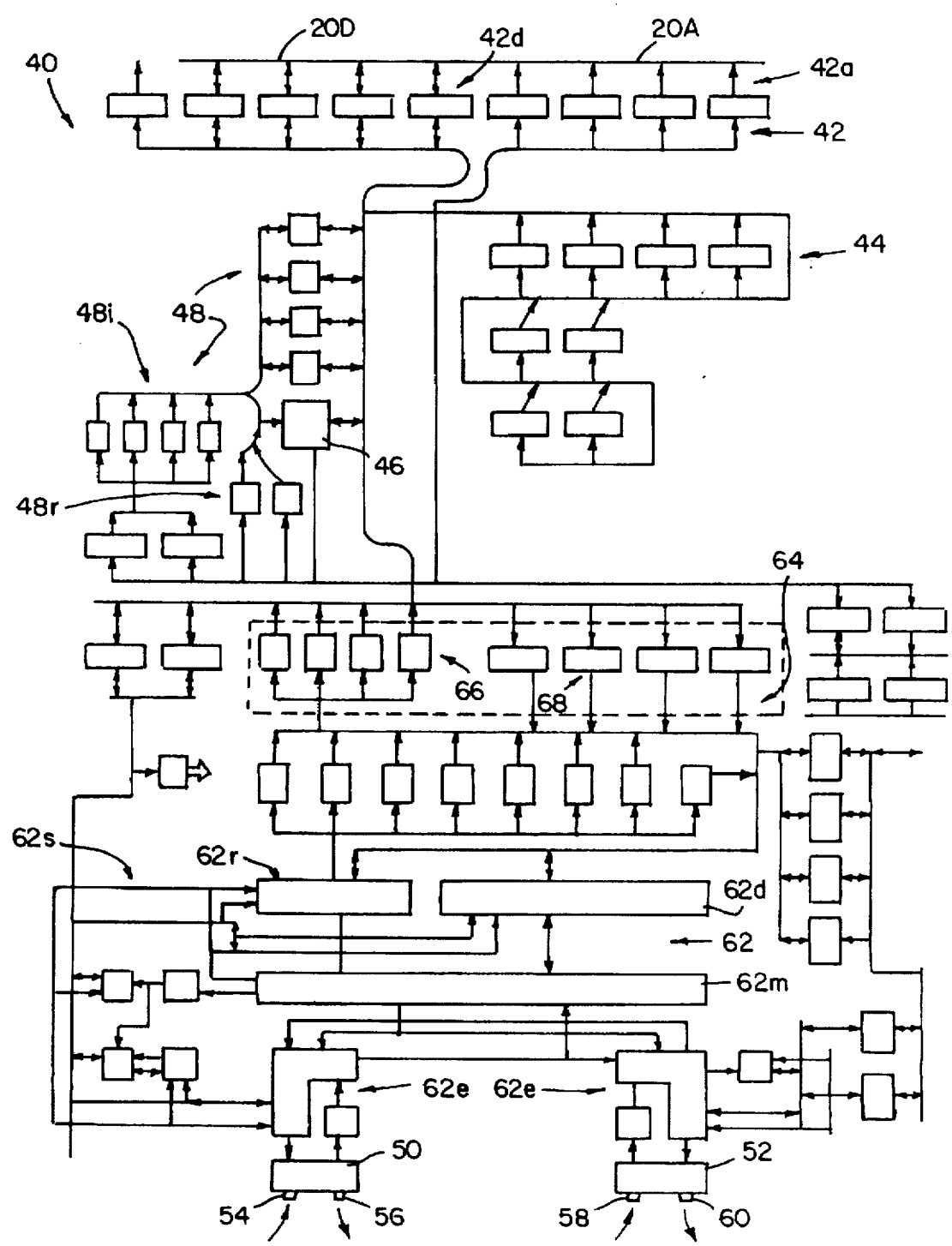
FIG. 3 is a schematic circuit diagram of a network attachment device embodying the present invention.

Referring specifically to FIG. 2, there is shown a block diagram of a specific implementation of the above described network attachment board 18. The implementation is similar to many commercial network attachment boards, for instance, an Ethernet board which uses a Motorola 68020. With reference to the block diagram of FIG. 2 and the disclosure hereof, one skilled in the art, for example, one being familiar with the Ethernet board or other network attachment board, would be able to construct specific circuitry that would perform the functions of the present invention. A schematic circuit diagram of such a specific circuit is illustrated in FIG. 3. Functions of such circuit are described with respect to FIGS. 2, 4 and 5.

Turning specifically to FIG. 2, a block diagram of a circuit 40 for carrying out the present invention is illustrated. The circuit 40 represents that included, for example, in the network attachment board 18 of FIG. 1. The circuit 40 interfaces between the node bus (VME bus) 20 and the ring 12, as is well known, to receive and to transmit messages with respect to the system bus 10 and the ring 12.

The circuit 40 includes VME transceivers 42, such as conventional buffers and the like, which receive data from the VME bus 20 and/or deliver data to the VME bus. It is noted here that reference to "data" means messages, information, signals, actual data, address information, etc. Such "data" typically would be in the form of logic signals. Also, as a preferred embodiment, the node bus 20 will be referred to as the VME bus and is so indicated in FIG. 2. Thus the transceivers 42, may be conventional data buffers and address buffers coupled to respective conductors in the system VME bus 20. Associated with the VME transceivers 42 are a number of VME slave registers 44. The slave registers 44 are used for synchronization of the AMD 29000 microprocessor (or other microprocessor used in the circuit 40) with the host CPU 16, for example, which is resident on the VME bus. Operational control of circuit 40 of the network board 18 is carried out by the microprocessor 46 and the instruction set provided it in memory 48, either ROM, RAM or both.

Associated with the ring 12 are a pair of conventional fiber optic modules 50, 52, which are coupled to respective fiber optic cables 54, 56, 58, 60 in a redundant fiber optic network ring arrangement. The fiber optic modules convert electrical data or signals into optical signals for transmission in the respective cables 54–60; and such modules also convert optical signals which are received thereby to electrical signals for use in the FDDI chip set 62.

The FDDI chip set 62 is one or a group of integrated circuits which function and cooperate in a conventional manner to interface directly with the fiber optic modules and the balance of the electrical functions in the circuit 40. The various chips and functions of the FDDI chip set include the performance of all FDDI MAC (media access control—media being, for example, the ring 12) functions, such as capturing the token from the ring 12, as is conventional in a ring. A frame buffer 64 is coupled between the FDDI chip set 62 and receiver FIFO (first in first out) buffer 66 and transmit data buffer 68. The frame buffer 64 can be accessed by both the FDDI chip set 62 and the microprocessor 46. The frame buffer 64 in particular contains data to be transmitted, which is placed by the microprocessor 46 into the frame buffer and removed by the FDDI chip set and placed onto the fiber optic ring 12; and received data from the ring 12 which is placed by the FDDI chip set into the frame buffer and is removed from the frame buffer by the microprocessor. The receive and transmit buffers 66, 68 provide smoothing and pipelining functions, as is conventional.

In operation of the circuit 40 of the network board 18 to receive data, a packet of data addressed to the node to which the circuit 40 is connected is seen by the FDDI chip set 62. Such FDDI chip set copies the data into the frame buffer 64. It then interrupts the microprocessor 46. The microprocessor through the use of the slave registers 44 previously had been given a list of memory locations on the VME bus, i.e., in the memory 14 of the local system, where data can be stored. The microprocessor 46 moves the data from the frame buffer 64 to the VME system bus 20 memory 14. Appropriate data splitting and checksum functions are performed in accordance with the invention during the data move. After the data has been stored in the VME bus memory 14, the microprocessor 46 interrupts the host CPU 16 to inform it of the fact that such data is in place in the memory and the memory location thereof. This transfer can be repeated multiple times performing a scattering operation as each message is received from the network bus 12.

In operation of the circuit 40 to transmit data from the local process, e.g., that under direct control of the CPU 16a, the host CPU 16a places data in the VME bus memory 14a. The host CPU 16a informs the microprocessor 46 that such data has been so placed by communicating with the microprocessor via the slave registers 44. The microprocessor 46 then moves the data from the VME bus memory 14a to the frame buffer 64. This transfer can be repeated multiple times performing a gathering operation to produce one message for transmission on the network bus 12. Thereafter the microprocessor 46 informs the FDDI chip set 62 of the fact that data is available in the frame buffer 64 for transmission out onto the network bus 12. The FDDI chip set 62 then transmits such data onto the ring 12 via the fiber optic modules 50, 52.

The above description of a network board 18 and the circuit 40 thereof is exemplary. Various types of network boards are available and can work or be made to work in the same or similar fashion to that described above. Preferably using the microprocessor 46 to control data transfer between the local CPU memory 14 and the network board 18, such transfer is of the DMA (direct memory access) type. Each network board 18 at each node coupled to the network bus 12 preferably would be similar in form and function to each other, e.g., as is described herein.

Turning briefly, now, to FIG. 3, a more comprehensive schematic electric circuit diagram of the circuit 40 used in the network board 18 is illustrated. The various parts of the circuit 40 illustrated in FIG. 3 correspond in form and function to those described above and designated by the same reference numeral with respect to the illustration of FIG. 2. The VME transceivers 42 include a plurality of data 42d and address 42a buffers, such as integrated circuits 74F646 and 74F373, respectively. The slave registers 44 include a plurality of control and status registers, which may be integrated circuits 74F374. The microprocessor 46 is an AMD 29000 microprocessor; and associated with it are instruction RAM 48i, including integrated circuits P4C164-25 and several decoding PAL circuits and buffer circuits, as well as several data buffers and ROM 48r, including integrated circuits 74F245 and 27C256-200.

The fiber optic modules 50, 52 are seen at the bottom of FIG. 3. Such modules are connected to the FDDI chip sets 62, which include an RBC chip 62r (such as an integrated circuit AM79C81), a MAC logic chip 62m (such as an integrated circuit AM79C83), and a DPC logic chip 62d (such as an integrated circuit AM79C82). The FDDI chip set also includes ENDEC and EDS chips collectively identified 62e. The chips 62e and the fiber optic modules 50, 52 comprise the physical layer; and the chips 62r, 62d, 62m comprise the data link layer. Also associated with each fiber optic module 50, 52 and the FDDI chip set 62 are several SMT counters 62s for fault isolation functions. As is seen in FIG. 3, the frame buffer 64 includes a plurality of buffers, such as integrated circuits MB81C84-65; the receive FIFO buffer 66 includes several buffers, such as IDT7201-25; and the transmit FIFO buffer 66 includes several buffers, such as 74F374 integrated circuits.

The foregoing description of the circuit 40 of FIG. 3 is intended to be exemplary, and it will be appreciated that the details of construction and components thereof would be quite evident to a person having ordinary skill in the field of network systems, for example. Moreover, it will be appreciated that the various features of the present invention also may be carried out on other types of network boards either in existing commercial state or appropriately revised to carry out the functions and process of the present invention.

To illustrate the operation of a conventional network attachment device 18, consider the example of a node trying to transfer a 16K data message (i.e., one that is 16 Kilobytes long) to another node where the maximum packet size allowed on the network at one time is 4.5K bytes (which allows room for 4K byte data segments together with appropriate headers and trailers for each data segment). The high level protocol is represented in TCP/IP as illustrated in FIG. 4, where node A is the transmitting node and node B is the receiving node.

Figure 4:
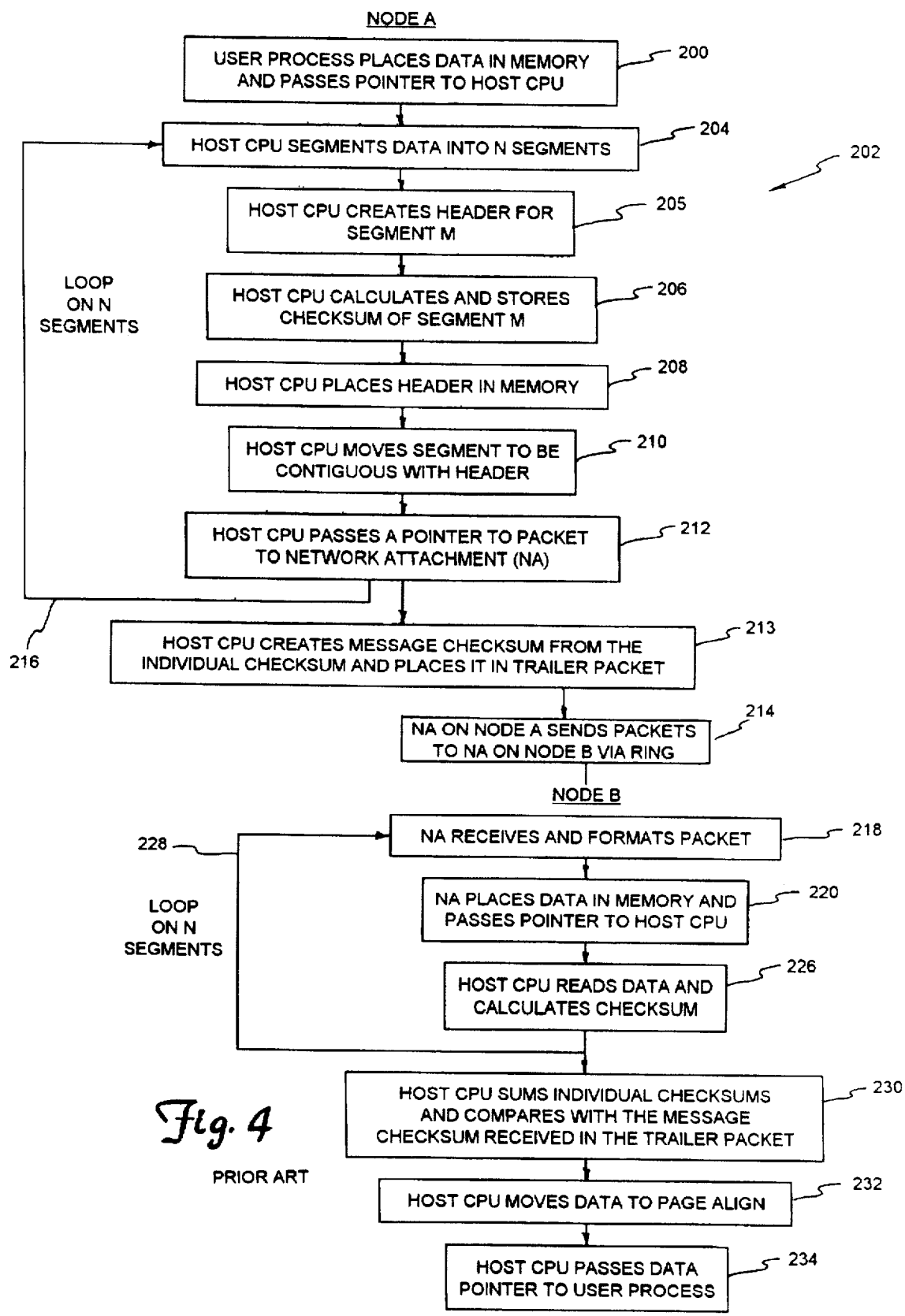
FIG. 4 is an illustration of an exemplary data transfer protocol for a prior art data bus for transmitting and receiving data between nodes.

The transfer begins when the user process executing on CPU 16a places the 16K data message in memory 14a and presents a pointer indicating the location of the message for use in the TCP/IP process as is represented at block 200 in FIG. 4. (The TCP/IP process, generally designated 202, is the implementation of the TCP/IP protocol and includes blocks 204-213.) The user process is the collection of functions normally executed by a node, for example, under control of the CPU 16 thereof, independently of data transfer protocol for the network bus. Therefore, the user process may represent a processor, a terminal, a printer, or other data-sharing peripherals connected to the node bus (VME bus) 20. The TCP/IP transmit process running on the host CPU of the transmitting node A first establishes communication with the receiving node B. The process then segments the message into N or in this example four 4K byte segments (see block 204 in FIG. 4) and creates a header for the first segment (block 205, wherein M refers to the segment currently being processed). As is well known, the header may identify the length of the message, the place to which it is to be sent, the origin, and/or other information concerning the message. It then calculates and stores the checksum for the first segment (block 206) by reading and summing all the words in the 4K segment and placing the result in memory. The header created for the first segment is placed in memory (block 208) and the corresponding data segment is moved to a position in memory contiguous with the header (block 210). This forms the first packet of data that will be transmitted to the receiving node.

The TCP/IP transmit process 202 then passes a pointer to the network attachment board 18 (defining the physical and data link layers) at block 212 indicating the location of the header and data in memory for the first segment. The network attachment device 18 then formats the message compatible with transmission over the ring 12 and transmits it (block 214) to the appropriate receiving node. Formatting may include, for example, the conditioning of a signal so it is properly recognizable and usable in the particular protocols employed, for example, FDDI protocol. This is repeated in a loop (represented at 216) for all four data packets which make up the message intended to be transmitted. Once all the packets have been sent, the transmitting node calculates the checksum of the whole 16K message by adding the checksum for each of the four segments (block 213). This is then transmitted to the receiving node as a trailer packet, again over the ring 12.

At the receiving node, for example, node B, the network attachment device 18b will receive the packet and reconstruct the transmitted message into a format for use by the TCP/IP process (block 218) running on the host CPU. The network attachment board will then place the total received message that includes the header and the data into a contiguous block of memory in the host (block 220). Usually such block memory is that referred to as restricted memory which means that the memory ordinarily is not directly accessible by the user process executing on cpu 16b. The network attachment device 18b will also pass a pointer indicating the location of that block in memory to the TCP/IP receive process (block 220).

The receive process will read the data and sum each word to calculate the individual checksum (block 226) for the particular data segment in question. This process of receiving the data through calculating the individual checksums (blocks 218 through 226) is repeated in a loop (generally indicated at 228) until all segments of the message have been received. The individual checksums are then summed and that result is compared to the checksum received from the transmitting node (block 230). If the checksums are not equal, a communication error is indicated to the transmitting node which may attempt to retransmit the messages, or take other action. If the checksums are equal the data is moved from restricted memory to user memory 14b and is arranged to fit on a word boundary, for example, is page aligned (block 232). Lastly, the TCP/IP passes a pointer (block 234) indicating the data page where the message is stored to the user process executing on CPU 16b at the receiving node (node B). This completes the transfer protocol. The user process may then utilize the message in accordance with its ordinary functioning.

The above operating description of the receiving node (node B) presumes that the TCP/IP process handles each 4K byte packet individually. Alternatively, each 4K byte packet may be received and stored until the complete message has been received whereupon the TCP/IP process would compute the checksum of the whole message and make the message accessible to the receiving user process.

Figure 5:
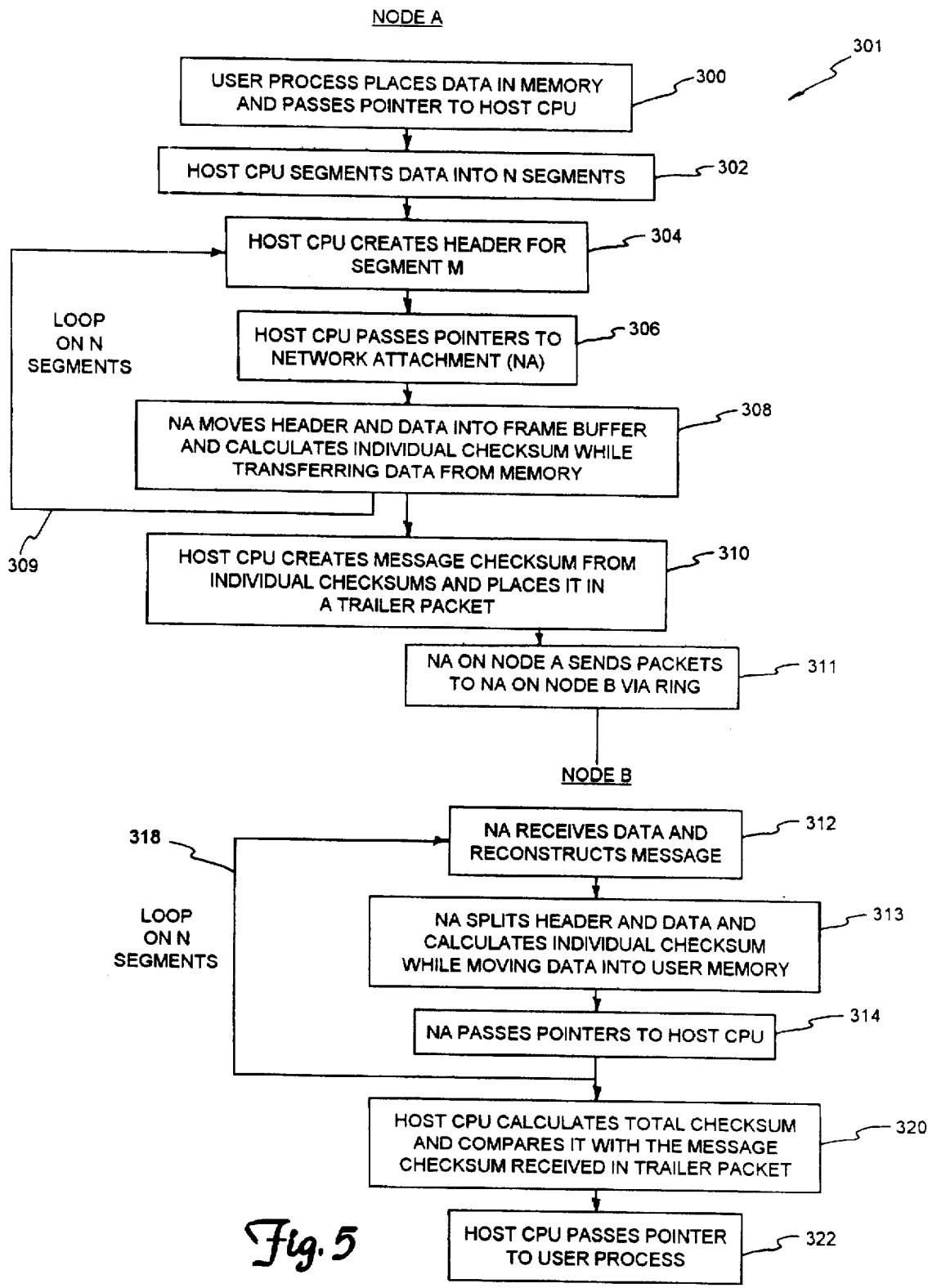
FIG. 5 is an illustration of a data transfer protocol for transmitting and receiving data between nodes in accordance with the present invention.

The above-described procedure is simplified and expedited by the present invention. Referring to FIG. 5, the example above of transmitting a 16K byte message from node A to node B is illustrated in accordance with the invention. To initiate the transfer, the user process running on CPU 16a will place the message in memory 14a and pass a pointer to the TCP/IP process (block 300).

When the TCP/IP transmit process (generally indicated at 301, which includes blocks 302-306) obtains the pointer to the 16K message from the user process, it does some initial communication with the receiver (node B). It likewise segments the message into four (N) 4K byte segments (see block 302), creates a header (block 304) for the first segment and passes pointers indicating the location of the header and first data segment to the network attachment device (block 306). This is where the advantages of the present invention become apparent.

The network attachment device 18a moves the header and data into the frame buffer while performing the checksum calculation during the move (block 308). It then returns the checksum value to the TCP/IP process. This is done in a loop for all four segments (indicated at block 309). The TCP/IP process can then calculate the checksum of the whole 16K byte message by adding only the four checksum values previously calculated by the network attachment device 18a (block 310). This resultant checksum is then transmitted in a trailer packet to the receiving node (node B) (block 311). Transmission of individual packets from node A to node B via ring 12 can be either concurrently with loop 309 or can follow completion of the various steps just described.

At the receiver (node B, for example), the network attachment device 18b will receive the packet and reconstruct the message into the appropriate format (block 312). It takes the header in the frame buffer, reformats the header, and places the reformatted header block in restricted memory to facilitate use by the TCP/IP process.

Thus, the network attachment device 18b will load the header into one location in restricted memory, as it loads the data segment into another page-aligned segment in user memory 14b (block 313). The TCP/IP process can access restricted memory, but the user process can only access user memory; both restricted memory and user memory may be respective portions of memory 14 or may be some other memory. Concurrently, the network attachment device 18b will also calculate the individual checksum of the received packet which is passed on to the TCP/IP receive process (block 313) along with pointers to the header and message (e.g., data) (block 314). This process is repeated (indicated generally at loop 318) until all (N) of the 4K byte data segments have been received.

Once the complete message has been received, the checksums of the four segments are then added and that result is compared to the checksum received in the trailing packet from the transmitting node (block 320). If the checksums are equal, the TCP/IP receive process will pass the pointer indicating the location of the data segment in memory 14b to the user process executing on CPU 16b (block 322). If the checksums do not match, error correction techniques can be employed, such as retransmission.

Since the bulk of the summations required to calculate the checksums were performed by the respective network attachment devices 18a, 18b during the moves into and out of node memory 14a, 14b, the TCP/IP transmit and receive processes had only to add four values to calculate the checksum. In the prior art all the data words in the 16K message had to be read and summed by the TCP/IP processes to obtain the checksum. This results in a significant reduction in processing time both on the transmitting and receiving ends of the distributed network 10, and correspondingly increases the bandwidth of the node(s) 11 and distributed network 10 in which the node(s) is (are) coupled.

Another advantage of the present invention is that the network attachment device places the message data on a page-aligned boundary in unrestricted user memory directly. This eliminates the execution of the additional move instructions necessary in the prior art to move the message data from restricted memory to user memory and to align it on a word boundary, which requires a significant number of instructions. This reduction in instructions and consequently execution cycles thus also increases the bandwidth of the node and distributed network.

Still another advantage is that the network attachment device of the present invention is capable of interpreting the headers appended to the data messages by the TCP/IP process. The network attachment device can thus inform the TCP/IP process of many of the message parameters contained in the header, such as length, number of segments, type of message, etc., before it has completed the move of the data segment. This contributes a degree of parallelism to the system and increases its throughput potential.

The various advantages of the present invention also are obtained when the TCP/IP process is run on a separate CPU than the user process CPU. This includes a separate CPU as a device on the system bus 20 or as a separate processor on the network attachment device 18.

While the invention has been explained with reference to a TCP/IP data bus protocol and a VME bus, It would be evident to one skilled in the art that the invention would be equally applicable to any layered network protocol or bus configuration. However, it would be equally evident that the invention is applicable to data busses with the transport/ network layer protocol implemented on a dedicated CPU or to a configuration where the transport/network layer protocol is executed on same the CPU as the user process.

Moreover, although the preferred embodiment of the invention uses the checksum method of error checking, it is contemplated according to the spirit and scope of the invention that other types of error checking also could be employed. The error checking mechanism usually depends on the protocol being implemented.

What is claimed is:

1. A method of transferring information from a first computer system to a second computer system over a system bus connecting the first computer system to the second computer system, the first and second computer systems each comprising:

a central processing unit (CPU);

node memory associated with the CPU, the node memory having a restricted memory portion and a user memory portion accessible by a user of the computer system; and a network attachment device, the node memory, CPU and network attachment device all being coupled by a data bus;

wherein the method comprises:

sending the information from the network attachment device of the first computer system to the network attachment device of the second computer system over the system bus;

writing the information, with the network attachment device, to the user memory portion of the node memory in the second computer system on a page-aligned boundary;

writing the information, with the network attachment device, to the restricted memory portion of the node memory in the second computer system;

substantially during the steps of writing, performing error detection steps on the information to determine whether errors have occurred; and if no errors have occurred, passing a pointer indicative of a memory location in the user memory where the information is stored, to the CPU in the second computer system.

2. The method of claim 1 wherein performing error detection steps comprises:

calculating, with the network attachment device, first redundant data based on the information;

receiving second redundant data, based on the information, from the first computer system; and comparing the first and second redundant data to determine whether errors have occurred.

3. The method of claim 2 wherein the information comprises a plurality of information segments and wherein performing error correction steps comprises:

performing the steps, at the network attachment device, of calculating and receiving for each of the information segments.

4. The method of claim 3 and further comprising:

transferring the first redundant data to the CPU in the second computer system for each information segment; and calculating, with the CPU in the second computer system, overall redundant data based on the first redundant data for each information segment.

5. The method of claim 4 wherein the first and second redundant data for each information segment comprise first and second checksums and wherein the overall redundant data comprises an overall checksum based on the first checksums for the information segments.

6. The method of claim 3 wherein sending the information from the network attachment device of the first computer system to the network attachment device of the second computer system over the system bus comprises:

transferring, with the network attachment device, data from the node memory of the first computer system to an output buffer;

calculating, with the network attachment device, redundant data for each information segment as the information segment is transferred to the output buffer;

providing the redundant data for each information segment to the CPU of the first computer system;

calculating, with the CPU in the first computer system, the second redundant data based on the redundant data for each of the information segments; and transferring the second redundant data to the second computer system.

7. A method of transferring information from a first computer system to a second computer system over a system bus connecting the first computer system to the second computer system, the first and second computer systems each comprising:

a central processing unit (CPU);

node memory associated with the CPU, the node memory having a restricted memory portion and a user memory portion accessible by a user of the computer system; and a network attachment device, the node memory, CPU and network attachment device all being coupled by a data bus;

wherein the method comprises:

sending the information in information segments from the network attachment device of the first computer system to the network attachment device of the second computer system over the system bus;

receiving the information segments with the network attachment device of the second computer system;

calculating, in the network attachment device in the second computer system, redundant data for each of the information segments;

providing the redundant data for each of the information segments from the network attachment device in the second computer system to the CPU in the second computer system; and calculating, in the CPU of the second computer system, overall redundant data based on the redundant data calculated for each information segment.

8. The method of claim 7 wherein receiving information segments with the network attachment device of the second computer system comprises:

writing the information segments, with the network attachment device, to the user memory portion of the node memory in the second computer system on a page-aligned boundary; and writing the information segments, with the network attachment device, to the restricted memory portion of the node memory in the second computer system.

9. The method of claim 8 and further comprising:

comparing the overall redundant data calculated by the CPU in the second computer system with overall redundant data received from the first computer system to determine whether errors have occurred; and if no errors have occurred, passing a pointer indicative of a memory location in the user memory of the second computer system where the information is stored, to the CPU in the second computer system.

10. The method of claim 9 wherein the redundant data for each information segment comprises a checksum and wherein the overall redundant data comprises an overall checksum based on the checksums for the information segments.

11. The method of claim 7 wherein sending the information in information segments from the network attachment device of the first computer system to the network attachment device of the second computer system over the system bus comprises:

transferring, with the network attachment device, data from the node memory of the first computer system to an output buffer;

calculating, with the network attachment device, redundant data for each information segment as the information segment is transferred to the output buffer;

providing the redundant data for each information segment to the CPU of the first computer system;

calculating, with the CPU in the first computer system, second redundant data based on the redundant data for each of the information segments; and transferring the second redundant data to the second computer system.

12. A method of transferring information from a first computer system to a second computer system over a system bus connecting the first computer system to the second computer system, the first and second computer systems each comprising:

a central processing unit (CPU);

node memory associated with the CPU, the node memory having a restricted memory portion and a user memory portion accessible by a user of the computer system; and a network attachment device, the node memory, CPU and network attachment device all being coupled by a data bus;

wherein the method comprises:

sending the information in information segments from the network attachment device of the first computer system to the network attachment device of the second computer system over the system bus, by:

transferring, with the network attachment device, data from the node memory of the first computer system to an output buffer;

calculating, with the network attachment device, redundant data for each information segment as the information segment is transferred to the output buffer;

providing the redundant data for each information segment to the CPU of the first computer system;

calculating, with the CPU in the first computer system, second redundant data based on the redundant data for each of the information segments; and transferring the second redundant data to the second computer system; and receiving the information segments with the network attachment device of the second computer system.

13. The method of claim 12, and further comprising:

calculating, in the network attachment device in the second computer system, redundant data for each of the information segments;

providing the redundant data for each of the information segments from the network attachment device in the second computer system to the CPU in the second computer system; and calculating, in the CPU of the second computer system, overall redundant data based on the redundant data calculated for each information segment.

14. The method of claim 13 wherein receiving information segments with the network attachment device of the second computer system comprises:

writing the information segments, with the network attachment device, to the user memory portion of the node memory in the second computer system on a page-aligned boundary; and writing the information segments, with the network attachment device, to the restricted memory portion of the node memory in the second computer system.

15. The method of claim 14 and further comprising:

comparing the overall redundant data calculated by the CPU in the second computer system with the second redundant data received from the first computer system to determine whether errors have occurred; and if no errors have occurred, passing a pointer indicative of a memory location in the user memory portion of the second computer system where the information is stored, to the CPU in the second computer system.

16. The method of claim 15 wherein the redundant data for each information segment comprises a checksum and wherein the second redundant data comprises an overall checksum based on the checksums for the information segments.

* * * * *